US008660483B2

(12) United States Patent
Tsuchida et al.

(10) Patent No.: US 8,660,483 B2
(45) Date of Patent: Feb. 25, 2014

(54) ANTENNA SWITCHING SYSTEM AND ANTENNA SWITCHING METHOD

(75) Inventors: Sunao Tsuchida, Mishima (JP); Masakazu Kato, Numazu (JP); Jun Yaginuma, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/308,637

(22) Filed: Dec. 1, 2011

(65) Prior Publication Data

US 2012/0142285 A1 Jun. 7, 2012

(30) Foreign Application Priority Data

Dec. 6, 2010 (JP) ................................ 2010-271575

(51) Int. Cl.
*H04B 7/185* (2006.01)

(52) U.S. Cl.
USPC ...... 455/13.3; 455/19; 455/562.2; 455/575.7; 340/10.1; 333/101; 343/876

(58) Field of Classification Search
USPC ............ 455/13.3, 19, 562.2, 575.7, 107, 121, 455/269, 41.2; 340/10.1, 10.4; 333/101, 333/117; 343/876; 375/299, 267, 260
See application file for complete search history.

(56) References Cited

U.S. PATENT DOCUMENTS

| | | | | |
|---|---|---|---|---|
| 3,868,695 | A * | 2/1975 | Kadak | 343/778 |
| 6,327,310 | B1 * | 12/2001 | Hochwald et al. | 375/259 |
| 6,363,121 | B1 * | 3/2002 | Hochwald et al. | 375/260 |
| 6,509,836 | B1 * | 1/2003 | Ingram | 340/572.4 |
| 6,636,495 | B1 * | 10/2003 | Tangemann | 370/334 |
| 6,885,345 | B2 * | 4/2005 | Jackson | 343/700 MS |
| 7,010,055 | B2 * | 3/2006 | Harrison et al. | 375/267 |
| 7,151,506 | B2 * | 12/2006 | Knowles et al. | 343/909 |
| 7,184,492 | B2 * | 2/2007 | Dent | 375/299 |
| 7,499,510 | B2 * | 3/2009 | Wee et al. | 375/347 |
| 8,264,408 | B2 * | 9/2012 | Kainulainen et al. | 342/417 |
| 8,344,823 | B2 * | 1/2013 | Bloy et al. | 333/101 |
| 8,451,125 | B2 * | 5/2013 | Hong et al. | 340/572.7 |
| 2004/0156443 | A1 * | 8/2004 | Dent | 375/267 |
| 2004/0201526 | A1 * | 10/2004 | Knowles et al. | 343/700 MS |
| 2007/0268815 | A1 * | 11/2007 | Wee et al. | 370/208 |
| 2009/0322613 | A1 * | 12/2009 | Bala et al. | 342/373 |
| 2011/0032079 | A1 * | 2/2011 | Bloy et al. | 340/10.1 |
| 2011/0095892 | A1 * | 4/2011 | Hong et al. | 340/572.7 |
| 2013/0093572 | A1 * | 4/2013 | Bloy et al. | 340/10.4 |
| 2013/0099898 | A1 * | 4/2013 | Bloy | 340/10.1 |

FOREIGN PATENT DOCUMENTS

| | | |
|---|---|---|
| JP | 2002-314469 | 10/2002 |
| JP | 2005-311740 | 11/2005 |
| JP | 2006-318078 | 11/2006 |
| JP | 2009-100274 | 5/2009 |
| JP | 2011-087287 | 4/2011 |
| JP | 2011-087288 | 4/2011 |

OTHER PUBLICATIONS

First Office Action of Reasons for Rejection for Japanese Patent Application No. 2010-271575 Dated Nov. 5, 2013, 5 pgs.

* cited by examiner

*Primary Examiner* — Minh D Dao
(74) *Attorney, Agent, or Firm* — Turocy & Watson, LLP

(57) ABSTRACT

According to one embodiment, an antenna switching system includes a (a≥3) antennas and a selector. The selector selects b1 (2≤b1<a) antennas out of the antennas at first timing, causes the selected antennas to configure an array antenna, selects, at second timing, b2 (2≤b2<a) antennas including c (1≤c<b1) antennas among the antennas used to configure the array antenna at the first timing out of the antennas, and causes the selected antennas to configure an array antenna.

20 Claims, 4 Drawing Sheets

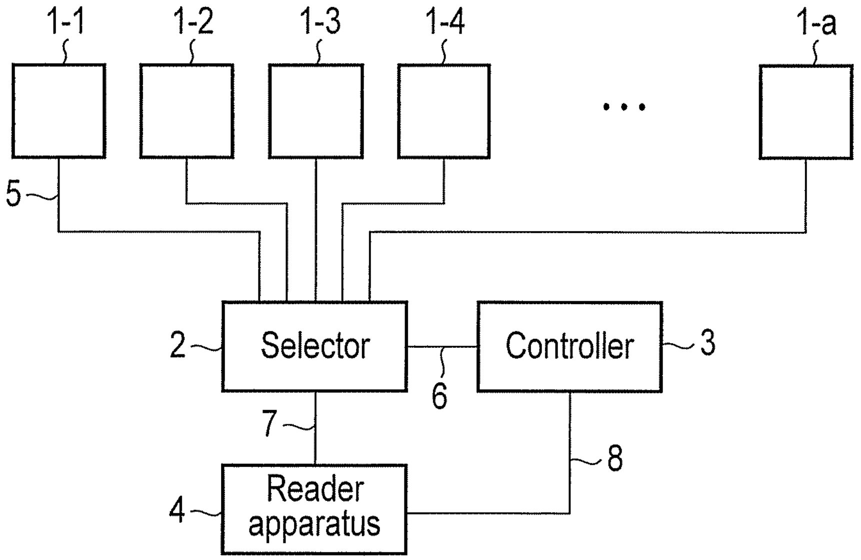
F I G. 1
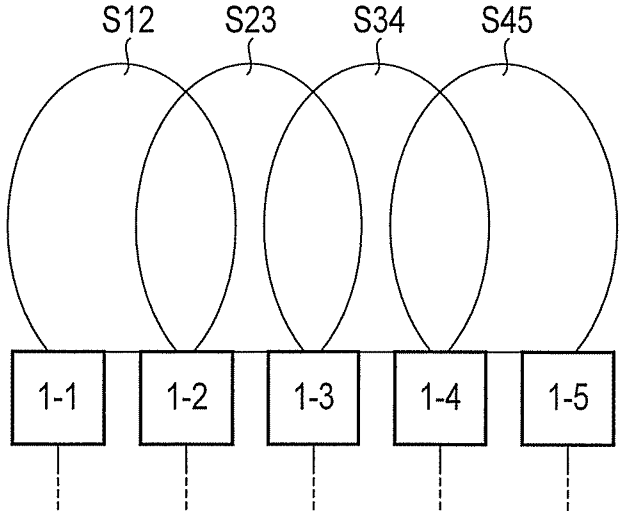
F I G. 2

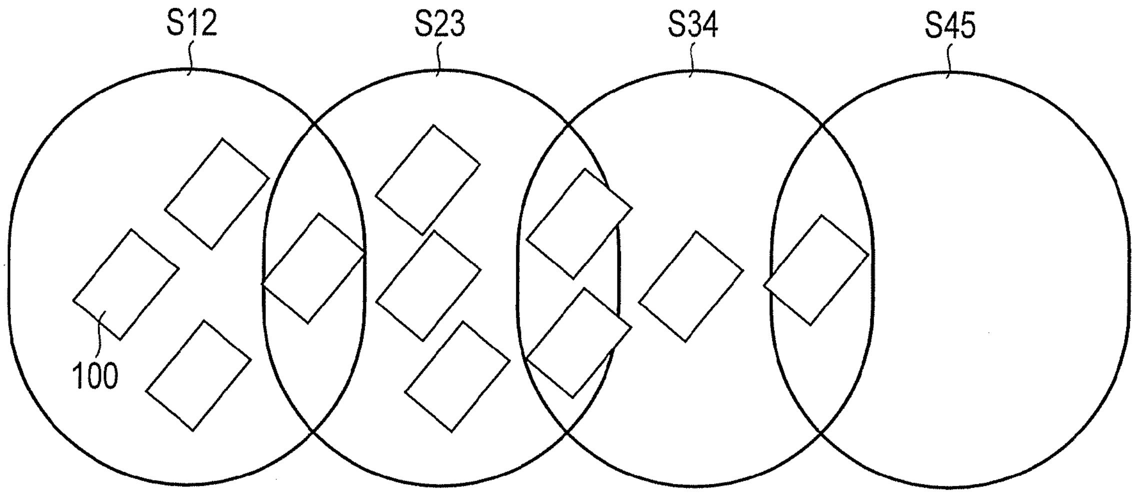
F I G. 3
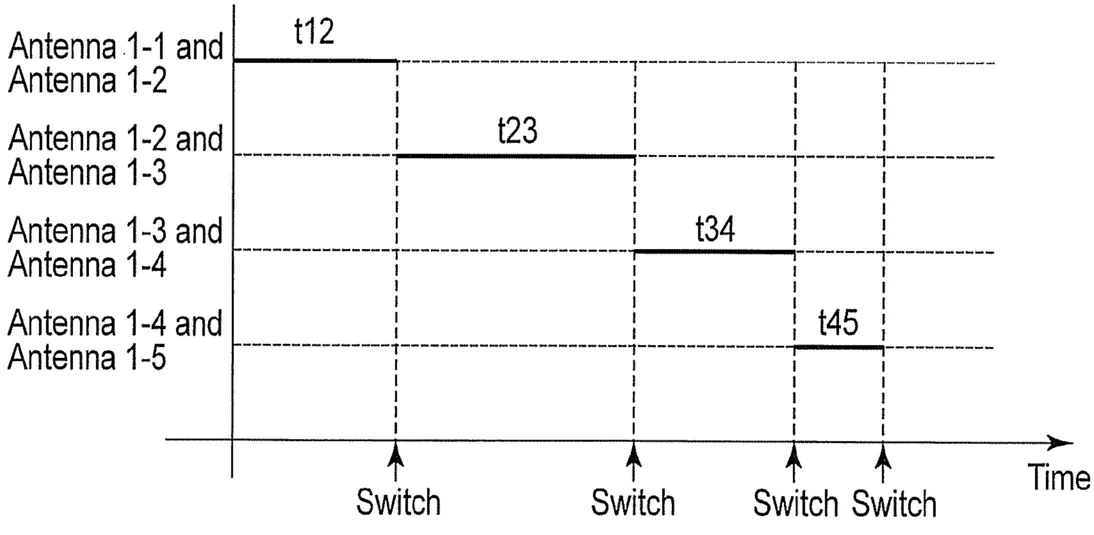
F I G. 4

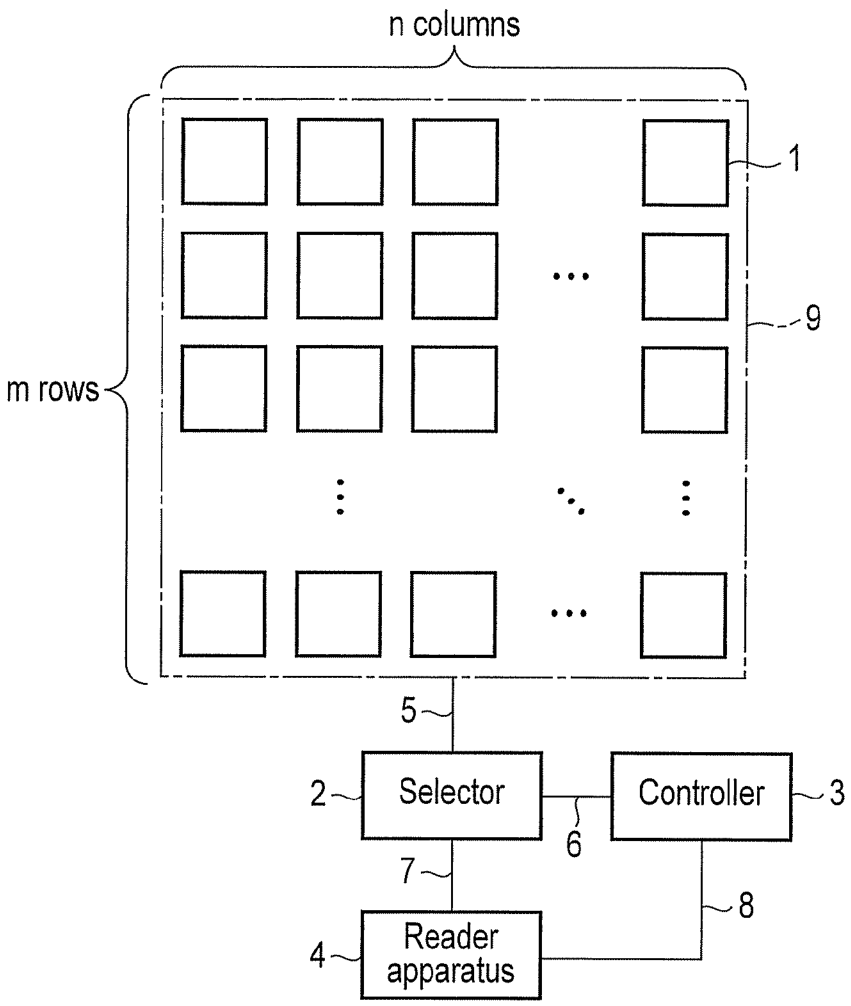
F I G. 5
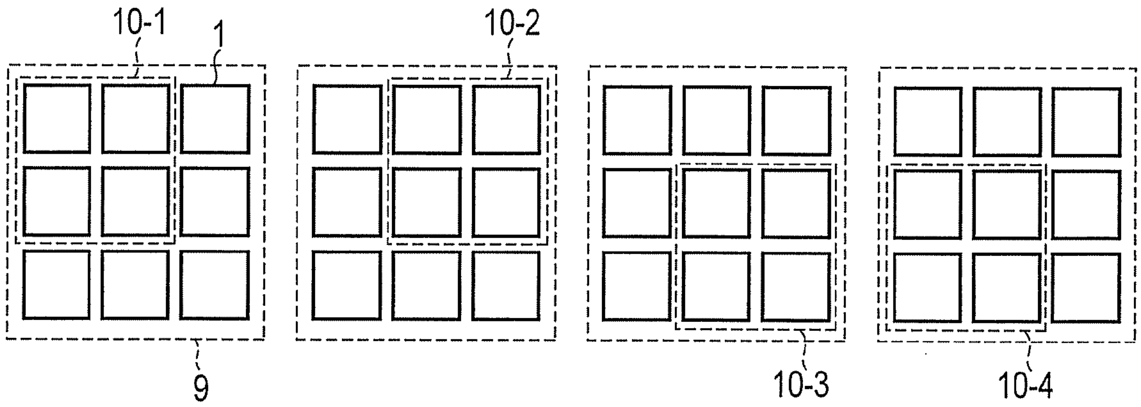
F I G. 6A F I G. 6B F I G. 6C F I G. 6D

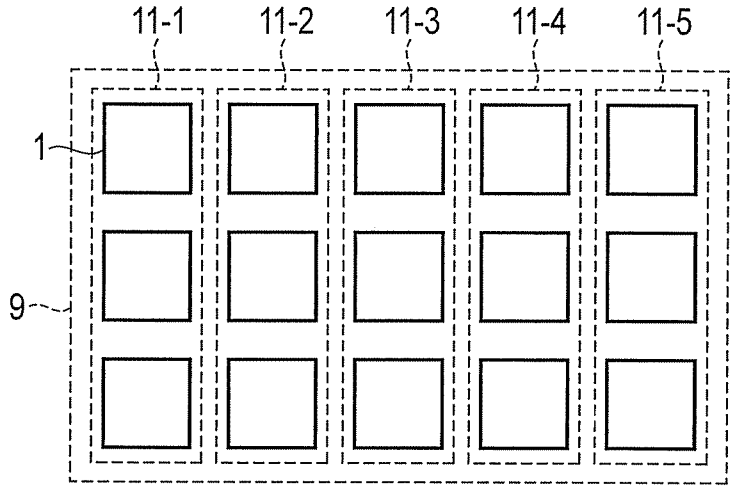
F I G. 7
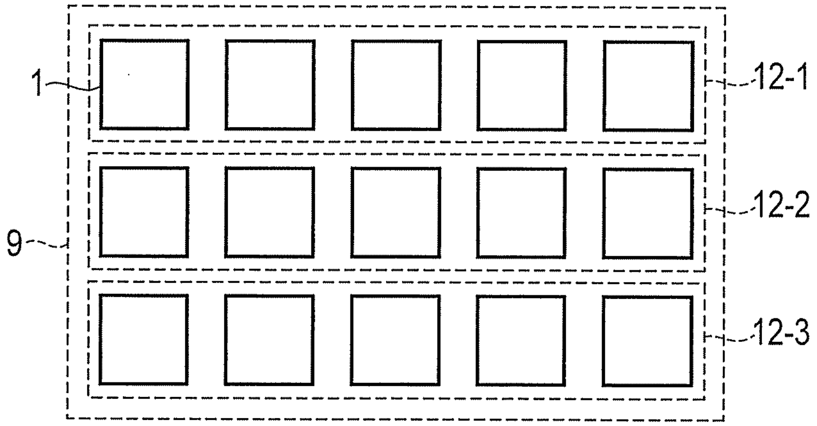
F I G. 8

ANTENNA SWITCHING SYSTEM AND ANTENNA SWITCHING METHOD

CROSS-REFERENCE TO RELATED APPLICATIONS

This application is based upon and claims the benefit of priority from the prior Japanese Patent Application No. 2010-271575, filed on Dec. 6, 2010, the entire contents of which are incorporated herein by reference.

FIELD

Embodiments described herein relate generally to a technique for performing wireless communication with a communication target using plural antennas.

BACKGROUND

In recent years, in stores and the like in the apparel industry, a system for attaching radio tags such as RFID (Radio Frequency Identification) tags to commodities and performing information collection and analyses such as receiving and shipping of commodities, inventory, and stock management is used.

As an example of this kind of the system, there is known a system for realizing, using a technique concerning RFID, a commodity shelf (also referred to as smart shelf) capable of acquiring information concerning commodities picked up by customers and a stock of the commodities on a real time basis. This system is configured to radiate a radio wave from an antenna set in a lower part of the commodity shelf to read, as required, radio tags affixed to commodities placed on the commodity shelf and, if there is a radio tag that cannot be read, discriminate that a commodity affixed with the radio tag is picked up by a customer and removed from the commodity shelf.

In order to improve discrimination accuracy in the commodity shelf, it is necessary to prevent the radio wave radiated from the antenna from leaking to the outside of the commodity shelf and enable radio tags in the commodity shelf to be surely read. In order to prevent the radio wave radiated from the antenna from leaking to the outside of the commodity shelf, it is necessary to sharpen the radiation pattern of the antenna. However, if the radiation pattern is sharp, a dead zone where the radio tags cannot be read is formed in the commodity shelf. It is conceivable to cope with such a problem using, for example, a method of reading the radio tags while switching plural antennas or a method of controlling phases of signals to array antenna elements using an array antenna to control a radiation direction of the antenna.

However, in the method of switching the antennas, in a distance near from the antennas in which radio waves radiated from the antennas do not completely spread, a dead zone is formed near the middle of the antennas to be switched. It is possible to solve this problem by densely laying the antennas. However, because of a space occupied by the antennas themselves, the antennas cannot be sufficiently densely laid. In the method of controlling the radiation direction of the antenna, a radio wave leaks to the outside of the commodity shelf.

Under such circumstances, it is necessary to take measures for enabling sure reading of radio tags present in a specific area while limiting a communication area of an antenna within the specific area.

BRIEF DESCRIPTION OF THE DRAWINGS

FIG. 1 is a configuration diagram of a wireless communication system in a first embodiment;

FIG. 2 is a diagram of a configuration example of an array antenna in the first embodiment;

FIG. 3 is a diagram for explaining antenna switching timing in the first embodiment;

FIG. 4 is a time chart of antenna switching in the first embodiment;

FIG. 5 is a configuration diagram of a wireless communication system in a second embodiment;

FIGS. 6A, 6B, 6C and 6D are diagrams of a configuration example of an array antenna in the second embodiment;

FIG. 7 is a diagram of a configuration example of a subarray of each column in the second embodiment; and FIG. 8 is a diagram of a configuration example of a subarray of each row in the second embodiment.

DETAILED DESCRIPTION

In general, according to one embodiment, an antenna switching system includes a ($a \geq 3$) antennas and a selector. The selector selects b1 ($2 \leq b1 < a$) antennas out of the antennas at first timing, causes the selected antennas to configure an array antenna, selects, at second timing, b2 ($2 \leq b2 < a$) antennas including c ($1 \leq c < b1$) antennas among the antennas used to configure the array antenna at the first timing out of the antennas, and causes the selected antennas to configure an array antenna.

Embodiments are explained below with reference to the drawings.

First Embodiment

System Configuration

FIG. 1 is a diagram of a wireless communication system that functions as an antenna switching system in the first embodiment. The wireless communication system includes a (a natural number, $a \geq 3$) antennas 1 (1-1, 1-2, 1-3, . . . , and 1-*a*) having the same shape, a selector 2, a controller 3, and a reader apparatus 4.

The antennas 1 are, for example, antennas that transmit and receive radio waves between the antennas and a communication target, which is an RFID tag. The antennas 1 are linearly arrayed at substantially equal intervals and connected to the selector 2 respectively via cables 5. As the cables 5, for example, a coaxial cable can be adopted.

The selector 2 and the controller 3 are connected via a cable 6. The selector 2 and the reader apparatus 4 are connected via a cable 7. The controller 3 and the reader apparatus 4 are connected via a cable 8. As the cables 6, 7, and 8, for example, a LAN (Local Area Network) cable can be adopted.

The reader apparatus 4 includes a transmitting section that supplies electric power (a high frequency signal) for causing the antennas 1 to transmit radio waves and a receiving section that demodulates response data on the basis of electric power output by the antennas 1 according to a radio wave received from the communication target. The response data demodulated in this way is output to a host apparatus (not shown) connected to the reader apparatus 4 and various kinds of information processing are performed.

The controller 3 outputs, according to an instruction to start communication with the communication target issued from the reader apparatus 4, a control signal for selecting an antenna used for transmission and reception of a radio wave out of the antennas 1 to the selector 2.

The selector 2 receives the control signal transmitted from the controller 3 and selects, on the basis of the received control signal, plural antennas 1 used for transmission and reception of radio waves out of the antennas 1. The selector 2 distributes and feeds the electric power, which is supplied from the reader apparatus 4, to the selected antennas 1, combines electric powers output by the selected antennas 1 when the selected antennas 1 receive a response signal, and outputs the combined electric power to the reader apparatus 4. In other words, an array antenna is configured by the plural antennas 1 selected by the selector 2.

The selection of antennas by the selector 2 may be realized in a hardware manner, for example, may be performed by connecting switches to signal lines from the antennas 1 included in the cable 5 and selectively turning on and off the switches. The selection of antennas by the selector 2 may be realized in a software manner, for example, may be performed by providing a processor connected to the signal lines from the antennas 1 included in the cables 5, selectively outputting electric power to the signal lines with the processor, and selectively capturing electric power input from the signal lines.

Switching of the Antennas

Switching of the antennas 1 by the controller 3 and the selector 2 is explained.

The antennas 1 used to configure the array antenna are switched in a combination and order set in advance according to an instruction of the start of transmission and reception of radio waves issued from the reader apparatus 4. If the switching starting from a first combination and returning to the first combination is assumed to be one cycle, a switching operation for the antennas 1 is continued in the cycle until the stop of the transmission and reception of the radio wave is instructed from the reader apparatus 4.

In this embodiment, the antennas 1 selected by the selector 2 are switched in a time division manner such that an array antenna is configured by b1 (a natural number, $2 \le b1 < a$) antennas 1 at first timing in the one cycle and, at second timing in the one cycle (different from the first timing), an array antenna is configured by b2 (a natural number, $2 \le b2 < a$) antennas including c (a natural number, $1 \le c < b1$) antennas 1 among the antennas 1 used to configure the array antenna at the first timing.

As a specific example, a case in which a=5, b1=b2=2, and c=1 and two antennas 1 adjacent to each other are sequentially selected from the antenna 1-1 side to configure an array antenna is explained with reference to FIG. 2. Under this condition, five antennas 1 (1-1 to 1-5) are selected by the selector 2 and the controller 3 sequentially outputs control signals for selecting the adjacent two antennas 1. All array antennas formed at respective timings have the same shape.

S (S12, S23, S34, and S45) in FIG. 2 indicate areas where communication is possible with radio waves radiated from the antennas. If a control signal for selecting the antennas 1-1 and 1-2 is transmitted from the controller 3 to the selector 2, the selector 2 selects the antenna 1-1 and the antenna 1-2 according to the received control signal and causes the antennas to configure an array antenna.

The communicable area S by the configured array antenna is the area S12. If a control signal for selecting the antenna 1-2 and the antenna 1-3 is transmitted from the controller 3 to the selector 2, the selector 2 selects the antenna 1-2 and the antenna 1-3 according to the received control signal and causes the antennas to configure an array antenna. The communicable range S by the configured array antenna is the area S23.

If a control signal for selecting the antenna 1-3 and the antenna 1-4 is transmitted from the controller 3 to the selector 2, the selector 2 selects the antenna 1-3 and the antenna 1-4 according to the received control signal and causes the antennas to configure an array antenna. The communicable range S by the configured array antenna is the area S34.

If a control signal for selecting the antenna 1-4 and the antenna 1-5 is transmitted from the controller 3 to the selector 2, the selector 2 selects the antenna 1-4 and the antenna 1-5 according to the received control signal and causes the antennas to configure an array antenna. The communicable area S by the configured array antenna is the area S45.

While the selection of the antennas 1 used to configure the array antenna is switched in this way, electric power for radio wave transmission is supplied from the reader apparatus 4 to the selector 2. Therefore, a communicable area of this wireless communication system is the union of the areas S12 to S45.

The antennas 1 may be selected at an interval of d (a natural number, $d \ge 1$) antennas 1 and caused to configure an array antenna rather than selecting the adjacent two antennas 1 and causing the antennas 1 to configure an array antenna. For example, with d set to 1, the antennas 1 configuring the array antenna may be selected at an interval of one antenna 1 like a combination of the antenna 1-1 and the antenna 1-3. With d set to 2 or more, the antennas 1 configuring an array antenna may be selected at an interval of plural antennas 1. Usually, as a distance between the antennas 1 to be selected is smaller, the radiation pattern of a configured array antenna is narrowed and a side lobe is also weakened. As a distance between the antennas 1 to be selected is larger, the radiation pattern of a configured array antenna is expanded and a side lobe is also intensified. Taking this into account, an array interval of the antennas 1 and a selection form of the antennas 1 only have to be determined according to a system to which the configuration in this embodiment is applied.

Like a combination of the antenna 1-1, the antenna 1-2, and the antenna 1-3, with b1 and b2 set to three or more, the selector 2 may be caused to simultaneously select three or more antennas 1 and the antennas 1 may be caused to configure an array antenna. Consequently, it is possible to sharpen the radiation pattern of the configured array antenna and increase a gain.

Antenna Switching Timing

Timing for switching the antennas 1 to be selected is explained. As the timing for switching the antennas 1, it is possible to adopt switching of the antennas 1 at a fixed interval or switching of the antennas 1 at an unfixed interval.

In the case of the fixed interval, the antennas 1 configuring an array antenna are always switched at a fixed time interval. In this case, the controller 3 is caused to output the control signal at a fixed interval set in advance. As a result, for example, in a specific example shown in FIG. 2, the communicable area S of an array antenna is formed at a fixed time interval in the order of the areas S12, S23, S34, and S45. Since a formation time of the communicable area S is fixed for array antennas, there is no difference in a communication time for each of the array antennas. This is effective, for example, when about the same numbers of communication targets are present in the communicable areas S of the array antennas or when a communication target entering the communicable area S is monitored.

A case of the unfixed interval of the switching timing for the antennas 1 to be selected is explained with reference to FIGS. 3 and 4. FIG. 3 is a diagram of an example of a state in which communication targets 100 are placed in the communicable areas S of the array antennas in the specific example shown in FIG. 2. As the communication targets 100, radio tags such as RFID tags are assumed.

FIG. 4 is a time chart of timing for switching the antennas 1 in the state shown in FIG. 3. In the figure, t indicates a time from the configuring of an array antenna by the selected antennas 1 until switching to the next antenna. Specifically, t12 indicates a time when the antenna 1-1 and the antenna 1-2 configure an array antenna, t23 indicates a time when the antenna 1-2 and the antenna 1-3 configure an array antenna, t34 indicates a time when the antenna 1-3 and the antenna 1-4 configure an array antenna, and t45 indicates a time when the antenna 1-4 and the antenna 1-5 configure an array antenna. When the antennas 1 are switched at the unfixed interval, the time t is determined according to a time required to perform communication with the communication targets 100 present in the communicable area S of a configured array antenna.

When an array antenna is configured using any ones of the antennas 1, if communication with all the communication targets 100 present in the communicable area S of the array antenna is completed, the reader apparatus 4 outputs information indicating the completion of the communication to the controller 3. As a method of determining whether the communication with all the communication targets 100 present in the communicable area S is completed, a well-known method can be adopted. For example, according to inability to obtain a response from a new communication target 100 even if a waiting time set in advance elapses, it only has to be determined that the communication with all the communication targets 100 present in the communicable area S is completed.

If the controller 3 receives the information indicating the completion of the communication output by the reader apparatus 4, the controller 3 outputs a control signal for selecting the antennas 1 used to configure the next array antenna to the selector 2. According to the reception of the control signal, the selector 2 selects the antennas 1 indicated by the control signal and causes the selected antennas 1 to configure an array antenna.

In an area where a large number of communication targets 100 are present such as the communicable area S23 shown in FIG. 3, an amount of communication with the reader apparatus 4 is large and time required until the completion of the communication is long. Accordingly, the time t23 when an array antenna is configured is long as shown in FIG. 4. On the other hand, in an area where there are a small number of communication targets 100 such as the communicable area S45 shown in FIG. 3, an amount of communication with the reader apparatus 4 is small and time required until the completion of the communication is short. Accordingly, the time t45 when an array antenna is configured is short as shown in FIG. 4.

In this way, the time t when an array antenna is configured is set to the unfixed interval, in particular, the time required for communication. This makes it possible to prevent a situation in which the antennas 1 are switched during the communication and the communication is disconnected. Further, since the time t is long if an amount of communication is large and the time t is short if an amount of communication is small, efficient communication is possible.

Concerning to which of the fixed interval and the unfixed interval the switching timing for the antennas 1 is set, the controller 3 only has to be set in advance to select appropriate one of the fixed interval and the unfixed interval taking into account a use or the like of the wireless communication system and output a control signal corresponding to the selected one.

Weighting of Electric Power

Weighting in distributing electric power fed to the antennas 1 configuring an array antenna and combining electric power output from the antennas 1 is explained.

The weighting is performed by the selector 2. During transmission of a radio wave, the selector 2 distributes, according to a ratio of weighting set in advance, electric power fed to the antennas 1 selected on the basis of a control signal from the controller 3. During reception of a radio wave, the selector 2 combines, according to the ratio of weighting, electric power output according to a radio wave received by the antennas 1 selected on the basis of a control signal from the controller 3.

As the ratio of weighting, for example, an equal ratio can be adopted. In the case of the equal ratio, electric power supplied from the reader apparatus 4 is equally distributed and supplied to the selected antennas 1. The antennas 1 combine, at the equal ratio, electric powers output according to the received radio wave and output the combined electric power to the reader apparatus 4.

As in the case of b1=b2=3, if an array antenna is configured using three or more antennas 1, the ratio of weighting may be set higher for the antenna 1 arranged in a position closer to the center of the selected antennas 1.

An example of this case is explained using the specific example shown in FIG. 2. If the selected antennas 1 are the antenna 1-1, the antenna 1-2, and the antenna 1-3, the ratio of weighting is set as, for example, 1:2:1, i.e., a ratio of the antenna 1-2 located in the center is set twice as large as a ratio of the other antennas. Electric power supplied from the reader apparatus 4 is distributed at the ratio of 1:2:1 and supplied to the antenna 1-1, the antenna 1-2, and the antenna 1-3. The antenna 1-1, the antenna 1-2, and the antenna 1-3 combine, at the ratio of 1:2:1, electric powers output according to a received radio wave and output the combined electric power to the reader apparatus 4.

If the selected antennas 1 are the antenna 1-1, the antenna 1-2, the antenna 1-3, and the antenna 1-4, the ratio of weighting is set as 1:2:2:1. The ratio of weighting is set higher for the antennas 1 arranged in positions closer to the center of the selected antennas 1 in this way. This makes it possible to suppress a side lobe of an array antenna and limitedly form communicable areas in a specific area.

As explained above, in this embodiment, the antennas 1 selected by the selector 2 are switched in a time division manner such that an array antenna is configured by the b1 antennas 1 at the first timing and, at the second timing, an array antenna is configured by the b2 antennas 1 including the c antennas 1 among the antennas 1 used to configure the array antenna at the first timing. In this way, the antennas 1 are shared at the different timings to configure the array antennas. This makes it possible to, in particular, eliminate dead zones formed among the antennas in the past in positions close to the antennas, obtain effects same as the effects obtained when array antennas are densely laid, and perform stable communication. It is possible to limit communicable areas formed by the antennas 1 within the specific area by adjusting characteristics of the antennas 1 and a frequency of a transmitted radio wave. Therefore, it is possible to surely read radio tags present in the specific area.

In the explanation of this embodiment, the plural antennas 1 configuring array antennas in order from an end are selected out of the arrayed plural antennas 1. However, the antennas 1 may be selected in random order. For example, in the specific example shown in FIG. 2, first, the antenna 1-2 and the antenna 1-3 may be caused to configure an array antenna and, next, the antenna 1-1 and the antenna 1-2 may be caused to configure an array antenna.

In one cycle, the numbers of times of configuring of array antennas do not have to be equal. For example, if a large number of radio tags, which are communication targets, are present near the center of the arrayed antennas 1, the number of times of configuring of an array antenna may be set larger for an array antenna closer to the center in one cycle by switching the antennas 1 such that array antennas are configured from the center to an end of the arrayed antennas 1 and then array antennas are configured from the center to the other end. This makes it possible to surely and efficiently communicate with the communication targets. Since the number of times of configuring of array antennas decrease near the ends of the arrayed antennas 1, the likelihood of communication with the communication targets present on the outer sides of the arrayed antennas 1 (e.g., the left of the area S12 and the right of the area S45 in FIG. 2) is reduced.

Second Embodiment

A second embodiment is explained.

This embodiment is different from the first embodiment in that the antennas 1 are arrayed in a matrix shape. Components same as those in the first embodiment are denoted by the same reference numerals and signs and repetitive explanation is made only when necessary.

System Configuration

FIG. 5 is a configuration diagram of a wireless communication system that functions as an antenna switching system in the second embodiment.

The wireless communication system includes an antenna group 9, the selector 2, the controller 3, and the reader apparatus 4. The antenna group 9 includes a ($a=m\times n$) antennas 1 arrayed at substantially equal intervals in a matrix shape of m (a natural number, $m\geq 2$) rows×n (a natural number, $n\geq 2$) columns. The antennas 1 are connected to the selector 2 via the cable 5.

The controller 3 outputs, according to an instruction to start communication with a communication target issued from the reader apparatus 4, a control signal for selecting the antenna 1 used for transmission and reception of a radio wave out of the antennas 1 to the selector 2.

The selector 2 receives the control signal transmitted from the controller 3 and selects, on the basis of the received control signal, plural antennas 1 used for transmission and reception of a radio wave out of the antennas 1. The selector 2 distributes and feeds electric power, which is supplied from the reader apparatus 4, to the selected antennas 1, combines electric powers output by the selected antennas 1 when the selected antennas 1 receive a response signal, and outputs the combined electric power to the reader apparatus 4. In other words, an array antenna is configured by the plural antennas 1 selected by the selector 2.

Switching of the Antennas

Switching of the antennas 1 by the controller 3 and the selector 2 is explained.

In this embodiment, as in the first embodiment, the antennas 1 selected by the selector 2 are switched in a time division manner such that an array antenna is configured by b1 (a natural number, $2\leq b1<a$) antennas 1 at first timing in the one cycle and, at second timing in the one cycle (different from the first timing), an array antenna is configured by b2 (a natural number, $2\leq b2<a$) antennas including c (a natural number, $1\leq c<b1$) antennas 1 among the antennas 1 used to configure the array antenna at the first timing.

As the b1 and b2 antennas 1, plural antennas 1 arrayed in a column direction or a row direction may be selected or the antennas 1 may be selected in a matrix shape of x (a natural number, $x\geq 2$) rows×y (a natural number, $y\geq 2$) columns.

As specific example, a case in which $m=n=3$, $b1=b2=4$, and $c=2$ and the antennas 1 are selected in a matrix shape of adjacent 2 rows×2 columns ($x=y=2$) to configure an array antenna is explained with reference to FIGS. 6A to 6D. Under this condition, nine antennas 1 are connected to the selector 2 and the controller 3 sequentially outputs control signals for selecting the antennas 1 of the adjacent 2 rows×2 columns. All array antennas formed at respective timings have the same shape.

FIGS. 6A to 6D are schematic diagrams of a state in which the antennas 1 are switched under the condition. FIGS. 6A to 6D indicate one cycle. 10 (10-1, 10-2, 10-3, and 10-4) in the figure indicates antenna groups selected by the selector 2. The controller 3 outputs a control signal for selecting the antennas 1 included in the antenna group 10-1, a control signal for selecting the antennas 1 included in the antenna group 10-2, a control signal for selecting the antennas 1 included in the antenna group 10-3, and a control signal for selecting the antennas 1 included in the antenna group 10-4 in this written order. Consequently, in the one cycle, array antennas are configured in the order of the antenna group 10-1, the antenna group 10-2, the antenna group 10-3, and the antenna group 10-4. In this cycle, two antennas 1 are shared in each of FIG. 6A and FIG. 6B, FIG. 6B and FIG. 6C, FIG. 6C and FIG. 6D, and FIG. 6D and FIG. 6A.

The antennas 1 may be linearly selected to cause the antennas 1 to configure an array antenna or may be selected at an interval of d (a natural number, d1) antennas 1 rather than selecting the antennas 1 in the matrix shape of the x columns×y rows to cause the antennas 1 to configure an array antenna.

The switching order of the antennas 1 to be selected is not limited to the switching order shown in FIGS. 6A to 6D. The antennas 1 may be switched in random order in such a manner as to, first, cause the antenna group 10-2 to configure an array antenna and, thereafter, cause the antenna group 10-1 and the antenna group 10-4 to configure array antennas. The numbers of times of selection of the antenna groups 10 do not have to be equal.

Concerning timing for switching the antennas 1, a fixed interval or an unfixed interval only has to be adopted as in the first embodiment.

Weighting of Electric Power

Weighting in distributing electric power fed to the antennas 1 configuring an array antenna and combining electric power output from the antennas 1 is explained.

The weighting is performed by the selector 2. During transmission of a radio wave, the selector 2 distributes, according to a ratio of weighting set in advance, electric power fed to the antennas 1 selected on the basis of a control signal from the controller 3. During reception of a radio wave, the selector 2 combines, according to the ratio of weighting, electric power output according to a radio wave received by the antennas 1 selected on the basis of a control signal from the controller 3.

As the ratio of weighting, for example, an equal ratio can be adopted. In the case of the equal ratio, electric power supplied from the reader apparatus 4 is equally distributed and supplied to the selected antennas 1. The antennas 1 combine, at the equal ratio, electric powers output according to the received radio wave and output the combined electric power to the reader apparatus 4.

If a selected antenna group includes the antennas 1 in three or more rows ($x\geq 3$), the ratio of weighting may be set higher for the antenna 1 arranged in a position closer to a row in the center. If a selected antenna group includes the antennas 1 in three or more columns ($y\geq 3$), the ratio of weighting may be set higher for the antenna 1 arranged in a position closer to a column in the center. For example, if an antenna group of 3 rows×3 columns is selected, if the ratio of weighting is set higher for the antenna 1 arranged in a position closer to a row in the center, the antennas 1 in the first, second, and third rows are weighted at a ratio of 1:2:1. If the ratio of weighting is set higher for the antenna 1 arranged in a position closer to a column in the center, the antennas 1 in the first, second, and third columns are weighted at a ratio of 1:2:1.

If an antenna group includes the antennas 1 in three or more rows and three or more columns, the ratio of weighting may be set higher for the antenna 1 arranged in a position closer to the center of a matrix formed by the selected antennas 1. For example, if an antenna group of 3 rows×3 columns is selected, the antennas 1 in the second row and the second column and the other antennas 1 are weighted at a ratio of 2:1. This makes it possible to suppress a side lobe of a configured array antenna.

As explained above, in this embodiment, the antennas 1 selected by the selector 2 are switched in a time division manner such that an array antenna is configured at first timing by b1 antennas 1 included in the antenna group 9 in which the antennas 1 are arrayed in a matrix shape and, at second timing, an array antenna is configured by b2 antennas including c antennas 1 among the antennas 1 used to configure the array antenna at the first timing. In this way, a part of the antennas 1 configuring the antenna group at the two timings in the one cycle are shared and the antenna group is caused to operate as an array antenna. This makes it possible to obtain effects same as the effects obtained when array antennas are densely arranged and form communicable areas all over in the front direction of the antenna group 9.

Besides, it goes without saying that effects same as the effects of the first embodiment are realized.

Third Embodiment

A third embodiment is explained.

This embodiment is different from the first and second embodiments in that the antennas 1 are arrayed in a matrix shape of m rows×n columns, a sub-array is configured by the antennas 1 in each row or each column and an array antenna is configured in a combination of sub-arrays. Components same as those in the first and second embodiments are denoted by the same reference numerals and signs and repetitive explanation is made only when necessary.

A system configuration in this embodiment is the same as the system configuration shown in FIG. 5. A wireless communication system includes the antenna group 9, the selector 2, the controller 3, and the reader apparatus 4. The antenna group 9 includes the plural antennas 9 arrayed at substantially equal intervals in a matrix shape of m (a natural number, m≥2) rows and n (a natural number, columns. The antennas 1 are combined for each column or each row to configure n or m sub-arrays.

Switching of the Antennas

In this embodiment, the antennas 1 selected by the selector 2 are switched in a time division manner such that an array antenna is configured by b1' sub-arrays at first timing in the one cycle and, at second timing in the one cycle (different from the first timing), an array antenna is configured by b2' sub-arrays including c' (a natural number, 1≤c'<b1') sub-arrays among the sub-arrays used to configure the array antenna at the first timing.

If the antennas 1 are combined for each column to configure sub-arrays, 2≤b1'<n and 2≤b2'<n. If the antennas 1 are combined for each row to configure a sub-array, 2≤b1'<m and 2≤b2'<m.

As a specific example, switching of the antennas 1 performed when a sub-array is configured for each column, m=3, n=5, b1'=b2'=2, and c'=1, and adjacent two sub-arrays are sequentially selected from a column of n=1 to configure an array antenna is explained with reference to FIG. 7. Under this condition, fifteen antennas 1 are connected to the selector 2 and the controller 3 sequentially outputs control signals for selecting the antennas 1 belonging to sub-arrays of adjacent two columns. All array antennas formed at respective timings have the same shape.

If the antennas 1 are combined for each column to configure sub-arrays, as shown in FIG. 7, sub-arrays 11 (11-1, 11-2, 11-3, 11-4, and 11-5) in five columns each including three antennas 1 are configured. The controller 3 outputs a control signal for selecting the antennas 1 included in the sub-arrays 11-1 and 11-2, a control signal for selecting the antennas 1 included in the sub-arrays 11-2 and 11-3, a control signal for selecting the antennas 1 included in the sub-arrays 11-3 and 11-4, and a control signal for selecting the antennas 1 included in the sub-arrays 11-4 and 11-5 in this written order. Consequently, in the one cycle, array antennas are configured in the order of the sub-array 11-1 and the sub-array 11-2, the sub-array 11-2 and the sub-array 11-3, the sub-array 11-3 and the sub-array 11-4, and the sub-array 11-4 and the sub-array 11-5.

As a specific example different from the specific example shown in FIG. 7, switching of the antennas 1 performed when a sub-array is configured for each row, m=3, n=5, b1'=b2'=2, and c'=1, and adjacent two sub-arrays are sequentially selected from a row of m=1 to configure an array antenna is explained with reference to FIG. 8. Under this condition, fifteen antennas 1 are connected to the selector 2 and the controller 3 sequentially outputs control signals for selecting the antennas 1 belonging to sub-arrays of adjacent two rows. All array antennas formed at respective timings have the same shape.

If the antennas 1 are combined for each row to configure sub-arrays, as shown in FIG. 8, sub-arrays 12 (12-1, 12-2, and 12-3) in three rows including five antennas 1 are configured. The controller 3 outputs a control signal for selecting the antennas 1 included in the sub-arrays 12-1 and 12-2 and a control signal for selecting the antennas 1 included in the sub-arrays 12-2 and 12-3 in this written order. Consequently, in the one cycle, array antennas are configured in the order of the sub-array 12-1 and the sub-array 12-2 and the sub-array 12-2 and the sub-array 12-3.

In both the configuring sub-arrays for each column and the configuring sub-arrays for each row, the sub-arrays may be selected at an interval of d (a natural number, d≥1) sub-arrays to configure an array antenna rather than selecting adjacent two sub-arrays to configure an array antenna. For example, in the specific example shown in FIG. 7, with d set to 1, the sub-arrays 11 configuring an array antenna may be selected at an interval of one sub-array like a combination of the sub-array 11-1 and the sub-array 11-3. With d set to 2 or more, the sub-arrays 11 configuring an array antenna may be selected at an interval of plural sub-arrays 11.

In both the configuring sub-arrays for each column and the configuring sub-arrays for each row, with b1' and b2' set to 3 or more, three or more sub-arrays may be simultaneously selected to configure an array antenna. Consequently, it is possible to sharpen the radiation pattern of the configured array antenna and increase a gain.

In both the configuring sub-arrays for each column and the configuring sub-arrays for each row, the switching order of sub-arrays to be selected is not limited to the selection of plural sub-arrays configuring an array antenna in order from a sub-array at an end and may be in random order. For example, in the specific example shown in FIG. 7, the sub-arrays may be switched in random order like the sub-array 11-1 and the sub-array 11-2, the sub-array 11-3 and the sub-array 11-4, the sub-array 11-2 and the sub-array 11-3.

In both the configuring sub-arrays for each column and the configuring sub-arrays for each row, the numbers of times of selection of the sub-arrays do not have to be equal in the one cycle.

Concerning timing for switching the sub-arrays to be selected, a fixed interval or an unfixed interval only has to be adopted as in the first embodiment.

Weighting of Electric Power

Weighting in distributing electric power fed to the antennas 1 configuring an array antenna and combining electric power output from the antennas 1 is explained.

The weighting in this embodiment is performed by the selector 2 for each selected sub-array or for each antenna 1 configuring a sub-array. During transmission of a radio wave, the selector 2 distributes, according to a ratio of weighting, electric power fed to the antennas 1 belonging to sub-arrays selected on the basis of a control signal from the controller 3. During reception of a radio wave, the selector 2 combines, according to the ratio of weighting, electric power received by the antennas 1 belonging to sub-arrays selected on the basis of a control signal from the controller 3.

As the ratio of weighting, for example, an equal ratio can be adopted. In the case of the equal ratio, electric power supplied from the reader apparatus 4 is equally distributed and supplied to the antennas 1 belonging to selected sub-arrays. The antennas 1 combine, at the equal ratio, electric powers output by the antennas 1 according to the received radio wave and output the combined electric power to the reader apparatus 4.

If there are three or more sub-arrays to be selected ($b1'$, $b2' \geq 3$), the ratio of weighting may be set higher for the antennas 1 configuring a sub-array arranged in a position closer to the center. If there are three or more antennas 1 configuring a sub-array (in the case of the antennas 1 in each column, $m \geq 3$ and, in the case of the antennas 1 in each row, $n \geq 3$), the ratio of weighting may be set higher for the antennas 1 arranged in positions closer to the center in the selected sub-arrays. For example, if a sub-array is configured for each column and three sub-arrays are selected, the antennas 1 in the first, second, and third columns are weighted at a ratio of 1:2:1 in order from one end.

Further, if there are three or more sub-arrays to be selected ($b1'$, $b2' \geq 3$) and three or more antennas 1 configuring a sub-array (in the case of the antennas 1 in each column, $m \geq 3$ and, in the case of the antennas 1 in each row, $n \geq 3$), the ratio of weighting may be set higher for the antennas 1 arranged in positions closer to the center of a matrix formed by the antennas 1 included in the selected sub-arrays.

Consequently, it is possible to suppress a side lobe of an array antenna.

As explained above, in this embodiment, the antennas 1 selected by the selector 2 are switched in a time division manner such that an array antenna is configured at the first timing by the $b1'$ sub-arrays included in the antenna group 9 in which the antennas 1 are arrayed in a matrix shape and, at the second timing, an array antenna is configured by the $b2'$ sub-arrays including the $c'$ sub-arrays among the sub-arrays used to configure the array antenna at the first timing. In this way, a part of the sub-arrays configuring the array antenna are shared at the two timings in the one cycle. This makes it possible to obtain effects same as the effects obtained when array antennas are densely arranged and form communicable areas all over in the front direction of the antenna group 9.

If the configuration of this embodiment is applied to the system including the smart shelf, it is possible to entirely read RFID tags of commodities displayed on the commodity shelf. Further, if sub-arrays are arranged along the width direction of the commodity shelf, a radio wave radiated from an array antenna is intensely concentrated in the center in the depth direction of the commodity shelf and does not read an RFID tag of a commodity picked up from the commodity shelf. Therefore, it is possible to detect that the commodity is picked up from the commodity shelf.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna switching system comprising:

a ($a \geq 3$) antennas; and a selector that selects b1 ($2 \leq b1 < a$) antennas out of the antennas at first timing, causes the selected antennas to configure an array antenna, selects, at second timing, b2 ($2 \leq b2 < a$) antennas including c ($1 \leq c < b1$) antennas among the antennas used to configure the array antenna at the first timing out of the antennas, and causes the selected antennas to configure an array antenna.

2. The system of claim 1, further comprising a reader apparatus that supplies, to the antennas selected by the selector, electric power for transmitting a radio wave and demodulates data on the basis of electric power output by the antennas selected by the selector when the antennas receive the radio wave.

3. The system of claim 1, wherein the antennas all have a same shape and are linearly arrayed at substantially equal intervals, and the selector selects a same number of antennas such that array antennas configured at the first and second timings have a same shape.

4. The system of claim 1, wherein the selector selects adjacent antennas at the first and second timings.

5. The system of claim 1, wherein the selector selects the antennas arranged at an interval of d ($d \geq 1$) antennas at the first and second timings.

6. The system of claim 1, wherein the selector distributes, according to a ratio of weighting set in advance, electric power fed to the selected antennas and combines, according to the ratio of weighting, electric powers output by the selected antennas according to a received radio wave.

7. The system of claim 6, wherein, if the selector selects three or more antennas at the first and second timings, the selector sets the ratio of weighting larger for the antenna arranged in a position closer to a center among the selected antennas.

8. An antenna switching system comprising:

a ($a \geq 4$) antennas arrayed in a matrix shape of m ($m \geq 2$) rows×n ($n \geq 2$) columns; and a selector that selects b1 ($2 \leq b1 < a$) antennas out of the antennas at first timing, causes the selected antennas to configure an array antenna, selects, at second timing, b2 ($2 \leq b2 < a$) antennas including c ($1 \geq c < b1$) antennas among the antennas used to configure the array antenna at the first timing, and causes the selected antennas to configure an array antenna.

9. The system of claim 8, further comprising a reader apparatus that supplies, to the antennas selected by the selector, electric power for transmitting a radio wave and demodulates data on the basis of electric power output by the antennas selected by the selector when the antennas receive the radio wave.

10. The system of claim 8, wherein the antennas all have a same shape, and the selector selects a same number of antennas such that array antennas configured at the first and second timings have a same shape.

11. The system of claim 8, wherein the selector selects antennas in a matrix shape of x (x≥2) rows×y (y≥2) columns at the first and second timings.

12. The system of claim 8, wherein the selector distributes, according to a ratio of weighting set in advance, electric power fed to the selected antennas and combines, according to the ratio of weighting, electric powers output by the selected antennas according to a received radio wave.

13. The system of claim 12, wherein, if the selector selects antennas in three or more rows at the first and second timings, the selector sets the ratio of weighting larger for the antenna arranged in a position closer to a row in a center among the selected antennas.

14. The system of claim 12, wherein, if the selector selects antennas in three or more columns at the first and second timings, the selector sets the ratio of weighting larger for the antenna arranged in a position closer to a column in a center among the selected antennas.

15. The system of claim 12, wherein, if the selector selects antennas in a matrix shape formed by three or more rows and three or more columns at the first and second timings, the selector sets the ratio of weighting larger for the antenna arranged in a position closer to a center of a matrix formed by the selected antennas.

16. The system of claim 8, wherein n sub-arrays including m antennas arranged in each column, and the selector selects b1' (2≤b1'<n) sub-arrays at the first timing, causes the selected sub-arrays to configure an array antenna, selects, at the second timing, b2' (2≤b2'<n) sub-arrays including c'(1≤c'<b1') sub-arrays among the sub-arrays used to configure the array antenna at the first timing, and causes the selected antennas to configure an array antenna.

17. The system of claim 16, wherein each of the sub-arrays includes three or more antennas, and the selector distributes, according to a ratio of weighting set in advance, electric power fed to the selected antennas and combines, according to the ratio of weighting, electric powers output by the selected antennas according to a received radio wave, and the selector sets the ratio of weighting larger for the antenna arranged in a position closer to a center of the sub-arrays among the selected antennas.

18. The system of claim 17, wherein the selector distributes, according to the ratio of weighting set in advance, electric power fed to the selected antennas and combines, according to the ratio of weighting, electric powers output by the selected antennas according to a received radio wave, and if the selector selects antennas belonging to three or more sub-arrays at the first and second timings, the selector sets the ratio of weighting larger for, among the selected antennas, the antennas belonging to the sub-array arranged in a position closer to a center among the three or more sub-arrays.

19. An antenna switching method comprising:

selecting b1 (2≤b1<a) antennas out of a (a≥3) antennas at first timing and causing the selected antennas to configure an array antenna; and selecting, at second timing, b2 (2≤b2<a) antennas including c (1≤c<b1) antennas among the antennas used to configure the array antenna at the first timing out of the antennas and causing the selected antennas to configure an array antenna.

20. The method of claim 19, further comprising supplying, at each of the first and second timings, to the selected antennas, electric power for transmitting a radio wave and demodulating data on the basis of electric power output by the selected antennas when the antennas receive the radio wave.

* * * * *